United States Patent [19]
Azuma et al.

[11] Patent Number: 5,462,148
[45] Date of Patent: Oct. 31, 1995

[54] VEHICLE MULTI-RATIO TRANSMISSION

[75] Inventors: Toshiro Azuma, Sanda; Yasuo Seno, Itami; Hiroshi Kitagawara, Kobe; Shusuke Nemoto, Yao, all of Japan

[73] Assignee: Kanzaki Kokyukoki Mfg. Co., Ltd., Amagasaki, Japan

[21] Appl. No.: 156,039

[22] Filed: Nov. 22, 1993

[30] Foreign Application Priority Data

Dec. 22, 1992 [JP] Japan ................. 4-092369 U

[51] Int. Cl.⁶ ................. F16D 23/10; F16H 3/08
[52] U.S. Cl. .......... 192/48.3; 192/48.7; 192/70.21; 74/339; 74/363
[58] Field of Search ............ 192/53 E, 53 F, 192/48.7, 48.3, 70.21; 74/357, 360, 363, 333, 339

[56] References Cited

U.S. PATENT DOCUMENTS

| | | | |
|---|---|---|---|
| 3,324,981 | 6/1967 | Aschauer | 192/48.3 |
| 3,542,176 | 11/1970 | Foxwell et al. | 74/333 |
| 4,116,082 | 9/1978 | Kelbel | 74/360 |
| 4,413,715 | 11/1983 | Michael et al. | 192/53 F |
| 4,485,687 | 12/1984 | Burke et al. | 74/358 |
| 4,830,159 | 5/1989 | Johnson et al. | 192/53 |
| 5,058,455 | 10/1991 | Nemoto et al. | 74/606 |

FOREIGN PATENT DOCUMENTS 2-212225 8/1990 Japan.

Primary Examiner—Rodney H. Bonck
Assistant Examiner—Sherry Lynn Estremsky

[57] ABSTRACT

In a vehicle multi-ratio transmission comprising a plurality of change-speed gear trains, including a backward directional gear train, with which synchronizer clutches are associated for actuating same, two multidisc-type synchronizer clutches (12) are employed for actuating one of forward directional gear trains, which is operated under a heavy condition, and for actuating the backward directional gear train. Cone-type synchronizer clutches (11) are employed for actuating the other gear trains. Seizing of clutch members as well as an unexpected start of the vehicle at a neutral condition of the transmission are well prevented and increase of cost for securing these advantages is suppressed.

3 Claims, 5 Drawing Sheets

VEHICLE MULTI-RATIO TRANSMISSION

FIELD OF THE INVENTION

This invention relates to a vehicle multi-ratio transmission which has a plurality of forward directional change-speed gear trains and a backward directional gear train. More particularly, the present invention relates to a multi-ratio transmission in which each of the change gear trains is actuated by a synchronizer clutch associated therewith.

BACKGROUND OF THE INVENTION

A synchronizer clutch which is employed in a vehicle change-speed transmission for a gear-coupling purpose is often composed of a cone synchronizer clutch of Borge Warner-type having a synchronizer key or a variation of Borg Warner-type having a synchronizer pin. In each of these cone-type synchronizer clutches, a synchronous rotation is attained by a frictional engagement between cones of the driving and driven sides of the clutch. Because cone diameter can be made larger in a pin-type clutch than in a key-type clutch owing to the arrangement of splines, pin-type synchronizer clutches are preferred in heavy-duty working vehicles such as tractors. At any events, a cone synchronizer clutch is associated with each of the change gear trains in a vehicle multi-ratio transmission so as to achieve respective change ratios by a selective operation of the respective synchronizer clutches as shown, for example, in JP, A No. 2-212225.

Frictional engaging area provided by a pair of cones in a cone synchronizer clutch is limited even in a pin-type clutch which can be designed to have a relatively large capacity. As a result of this, it has been experienced that cone surfaces in a cone synchronizer clutch which is associated with a heavily operated change-speed gear train such as a frequently actuated gear train or a gear train for a low speed, high torque change transmission cannot sometimes absorb a sufficient amount of energy so that seizing of such cone surfaces is caused. From this, it is considered to employ multidisc-type synchronizer clutches already known from, for example, U.S. Pat. No. 4,830,159 and No. 5,058,455, so as to enlarge frictional engaging area and to thereby eliminate such problem. A synchronizer clutch of this type is, however, relatively expensive because of its large number of elements. Further, a multidisc synchronizer clutch has a problem that some engagement between its frictional discs or elements of the driving side and of the driven side may be caused in a clutch-disengaged condition due to rotational torque of the frictional elements of driving side. Such engagement of clutch may cause an unexpected start of the vehicle at a neutral condition of the change transmission.

Accordingly, a primary object of the present invention is to provide an improved multi-ratio transmission which eliminates the drawback of a change transmission employing cone-type synchronizer clutches and which also solves the problems of employing multidisc-type synchronizer clutches.

SUMMARY OF THE INVENTION

The present invention relates to a vehicle multi-ratio transmission which has a plurality of forward directional change-speed gear trains and a backward directional gear train and in which each of the gear trains is actuated by a synchronizer clutch associated therewith. According to the present invention, a multidisc-type synchronizer clutch (12) is associated with each of one forward directional change-speed gear train, which is heavily operated, and the backward directional gear train, whereas a cone-type synchronizer clutch (11) is associated with each of the other forward directional change-speed gear trains.

The phrase "heavily operated" used herein with respect to a change-speed gear train means that the gear train is subjected to a relatively heavy condition in operation so that the synchronizer clutch associated with such gear train is burdened with a heavy duty. One example of such change-speed gear train is a gear train which is frequently actuated and disactuated so that the synchronizer clutch associated therewith is frequently engaged and disengaged. Another example is a change-speed gear train which provides in operation a low speed of the vehicle so that relatively large torque is transmitted through the synchronizer clutch associated with this gear train. Such heavily operated change-speed gear train differs from vehicle to vehicle in accordance with the purpose of use of the vehicle as well as the type of the vehicle.

A multidisc-type synchronizer clutch has a relatively large capacity, as compared to a cone-type synchronizer clutch, owing to the frictional engaging area provided by a plurality of frictional discs or elements, and such capacity can be increased with ease by increasing the number of the frictional elements employed. Consequently, employment of such multidisc-type clutch as a synchronizer clutch to be associated to a heavily operated gear train will eliminate the problem of seizing between frictional engaging surfaces.

In the transmission according to the present invention, a pair of multidisc-type synchronizer clutches are employed such that one of the clutches is associated with one of the forward directional gear trains and the other clutch is associated with the backward directional gear train. These clutches provide respectively, when engaged, rotations of opposite directions to a transmission shaft of the driven side of the change-speed transmission. Consequently, rotational torque tending to be transmitted to the driven side of the disengaged clutch associated with the forward directional gear train due to some engagement between the frictional elements of this clutch is offset by rotational torque tending to be transmitted to the driven side of the disengaged clutch associated with the backward directional gear train due to some engagement between the frictional elements of this clutch. It is thus seen that an unexpected start of the vehicle from a neutral condition of the change-speed transmission will be well prevented.

Of the plurality of synchronizer clutches, two are of a multidisc-type and the others are of a cone-type. Consequently, the number of relatively expensive multidisc-type clutches employed is minimum in the transmission according to the present invention. By this, increase in manufacturing cost is suppressed.

BRIEF DESCRIPTION OF THE DRAWINGS

The present invention and its attendant advantages will become more readily apparent as the specification is considered in conjunction with the accompanying drawings in which.

DESCRIPTION OF PREFERRED EMBODIMENTS

Figure 1:
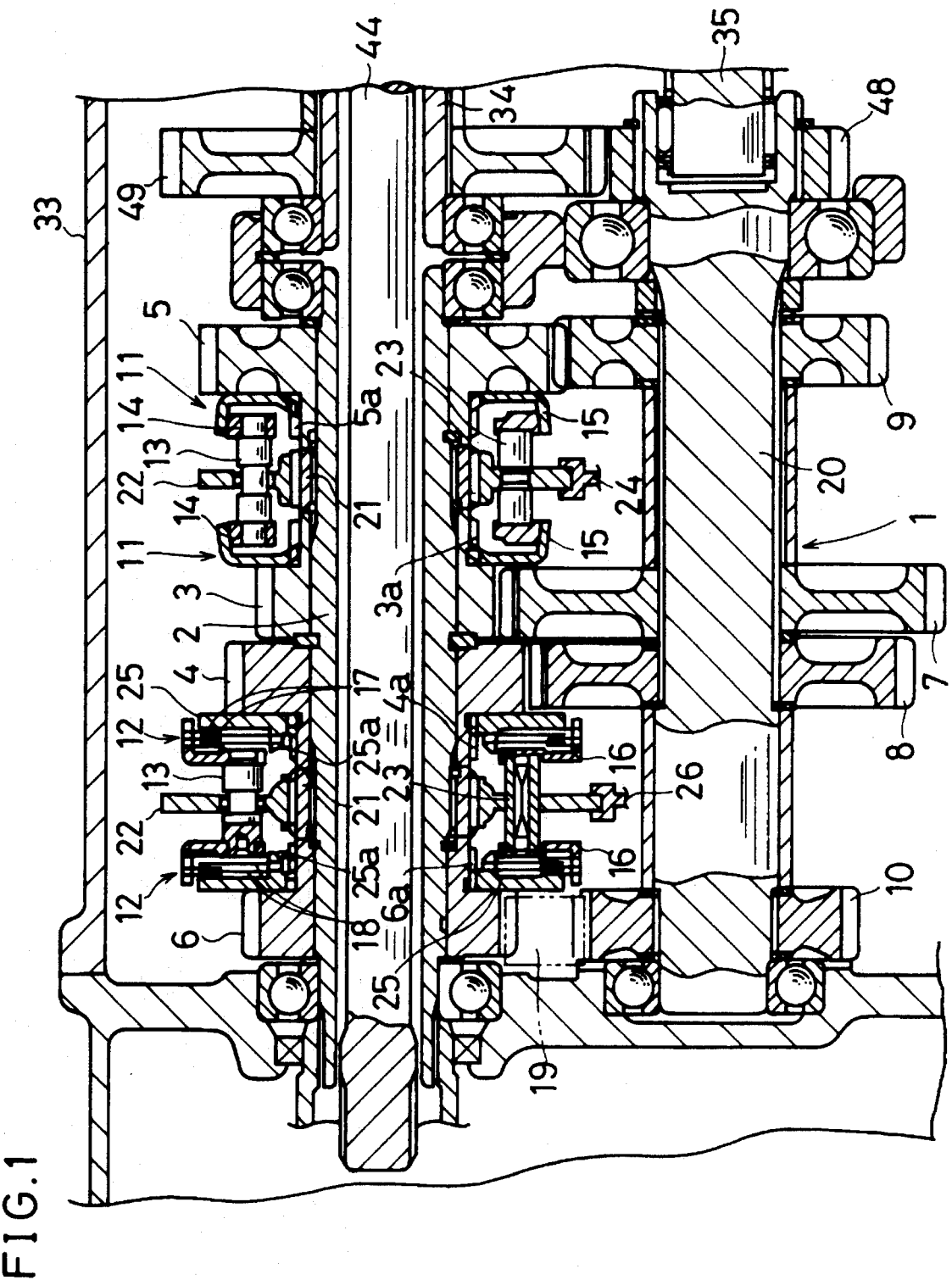
FIG. 1 is a sectional side view of a part of a tractor in which a first preferred embodiment of the vehicle multi-ratio transmission according to the present invention is employed.
Figure 2:
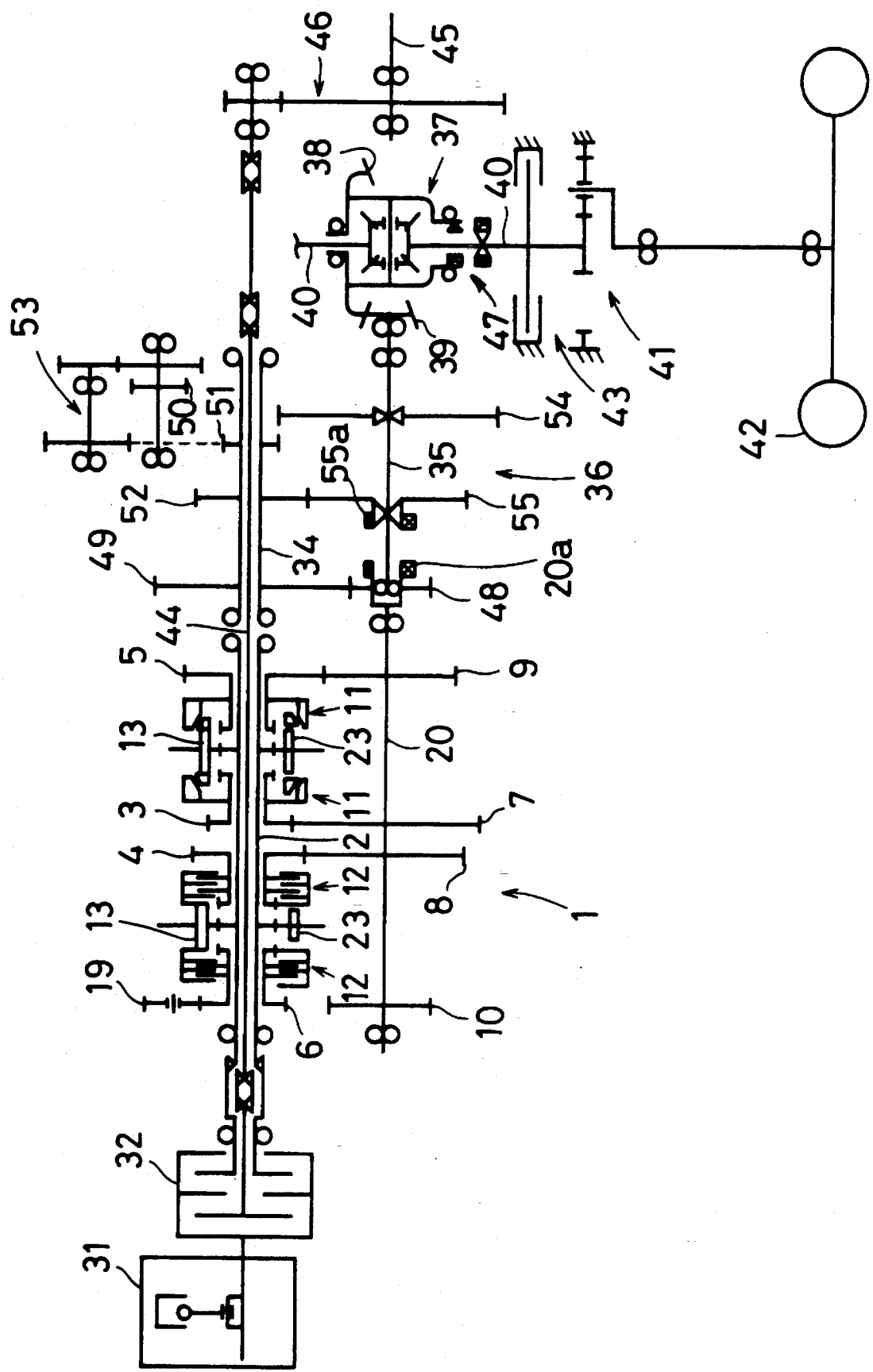
FIG. 2 is a schematic diagram showing transmission mechanisms in the tractor.
Figure 3:
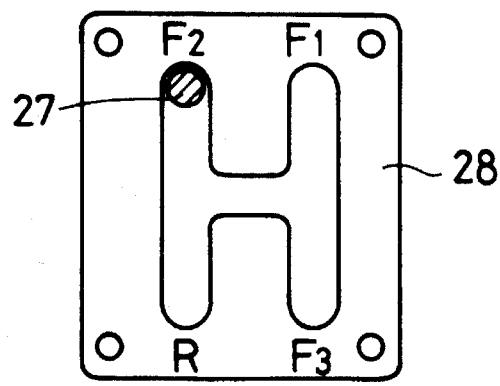
FIG. 3 is a plane view of a change lever guide employed in the tractor.

FIGS. 1 to 3 illustrate a first preferred embodiment of the present invention which is employed in a tractor including transmission mechanisms shown in FIG. 2.

As shown in FIGS. 1 and 2, a hollow drive shaft 2, which is driven to rotate by an engine 31 through a main clutch 32, and a speed-change shaft 20 which is disposed below the drive shaft 2 are journalled in a fronter half of a transmission casing 33 which constitutes a part of the vehicle body of tractor. A main change-speed transmission 1 is disposed between these drive shaft 2 and change shaft 20 and has a structure according to the present invention. As shown in FIG. 2, an auxiliary change-speed transmission 36 is disposed between a hollow intermediate shaft 34, which is arranged co-axially with and behind the drive shaft 2, and a propeller shaft 35 which is arranged co-axially with and behind the change shaft 20. The propeller shaft 35 has at its rear end a bevel pinion 39 which is in meshment with a larger input bevel gear 38 of a differential gearing 37. Left and right output shafts 40 of the differential gearing 37 are operable to drive left and right rear wheels 42 of the tractor through left and right speed reduction planetary gearings 41. A brake 43 is associated with each output shaft 40. A drive shaft 44 of power take-off line which is driven to rotate by engine 31 through the main clutch 32 extends rearwardly through the hollow drive shaft 2 and intermediate shaft 34 and is operable to drive a PTO-shaft, extending rearwardly from the tractor, through a speed reduction gearing 46. The main clutch 32 is composed of a dual clutch which is operable to disconnect, by being applied a first stage disengaging operation, the hollow drive shaft 2 from the engine 31 and to disconnect, by being applied a second stage disengaging operation, the drive shaft 34 of power take-off line from the engine 31. In FIG. 2, numeral 47 designates a lock-up clutch for disabling the differential gearing 37.

As shown in FIGS. 1 and 2, the main change-speed transmission 1 comprises forward directional first to third-speed gears 3, 4 and 5 and a backward directional gear 6, which are rotatably mounted on the drive shaft 2, and forward directional first to third-speed gears 7, 8 and 9 and a backward directional gear 10 which are fixedly mounted on the change shaft 20. Of these gears, the forward directional gears 3, 4 and 5 on the drive shaft are directly meshed respectively with the forward directional gears 7, 8 and 9 on the change shaft. The backward directional gear 6 is meshed with the backward directional gear 10 through a freely rotatable idler gear 19. The backward directional gear 6 and second-speed gear 4 are disposed on a fronter half of the drive shaft 2 with an interval therebetween, and the first-speed gear 3 and third-speed gear 5 are disposed on a rearer half of the drive shaft 2 with an interval therebetween. The tractor (not shown) in which the first embodiment is employed is designed such that it is to be equipped at its front end a front loader (not shown), and the vehicle speed will be changed frequently in use of such front loader between the forward directional second speed and the backward directional speed. From this, multidisc synchronizer clutches of pin type 12 are associated respectively with gears 4 and 6 for providing such vehicle speeds while cone synchronizer clutches of pin type 11 are associated respectively with the other gears 3 and 5 on the drive shaft 2.

As clearly shown in FIG. 1, two cone-type synchronizer clutches 11 for coupling the first-speed gear 3 and third-speed gear 5 selectively to the drive shaft 2 are composed to a cone-type synchronizer double clutch assembly in which a splined hub 21 disposed between the gears 3 and 5 and mounted fixedly on the drive shaft 2, a shifter 22 spline-fitted on the splined hub 21, one or more synchronizer pins 13, and one or more thrust pins 23 secured to the shifter 22 are made common to both of the clutches 11. As is usual, splines 3a and 5a which are aligned with splines of the splined hub 21 are formed in the boss portions of gears 3 and 5. A first cones 14 are secured to the ends of synchronizer pin 13, while second cones 15 are co-rotatably mounted on the boss portions of gear 3 and 5 using splines 3a and 5a. Shifter 22 is adapted to be displaced towards gear 3 or 5 using a shifter fork 24. In operation, a displacement of the shifter 22 causes thrust pin 23 to push the first cone 14 and to thereby start up a frictional engagement between the first and second cones 14 and 15. While a further displacement of the shifter 22 is restrained by an engagement between a tapered surface in a middle stepped portion of the synchronizer pin 13 and a tapered surface in an inner wall of the pin-passing bore in the shifter 22, the first and second cones 14 and 15 are fully engaged so that a synchronous rotation is attained. By this, a further displacement of the shifter 22 is caused so as to mesh with splines 3a or 5a so that gear 3 or 5 is coupled to the drive shaft 2.

Similarly, the two multidisc-type synchronizer clutches 12 for coupling the second-speed gear 4 and backward directional gear 6 selectively to the drive shaft 2 are composed to a synchronizer double clutch assembly in which a splined hub 21, a shifter 22, one or more synchronizer pins 13, and one or more thrust pins 23 are made common to these two clutches 12. Splines 4a and 6a which are aligned with splines of the splined hub 21 are also formed in the boss portions of gears 4 and 6. Hollow cylindrical carriers 16 are secured to the ends of synchronizer pin 13, while a reaction ring 25 having an integral hollow cylindrical portion 25a is co-rotatably mounted on the boss portion of each gear 4, 6 using splines 4a, 6a. A plurality of alternately arranged first and second frictional elements 17 and 18 are slidably but non-rotatably supported by the carrier 16 and by the cylindrical portion 25a. Shifter 22 is adapted to be displaced towards gear 4 or 6 using a shifter fork 26. In operation, a displacement of the shifter 22 causes thrust pin 23 to push the carrier 16 and to thereby start up an engagement between the first and second frictional elements 17 and 18. While a further displacement of the shifter 22 is restraind by an engagement between tapered surfaces in the synchronizer pin 13 and in the shifter 22, the first and second frictional elements 17 and 18 are fully engaged so that a synchronous rotation is attained. By this, a further displacement of the shifter 22 is caused so as to mesh with splines 4a or 6a so that gear 4 or 6 is coupled to the drive shaft 2.

In spite of the difference in frictional engaging surfaces between the cone-type synchronizer clutch 11 and the multidisc-type synchronizer clutch 12, these clutches operate on a same principle. Consequently, splined hubs 21, shifters 22, synchronizer pins 13 and thrust pins 23 of a same design can be employed in these clutches 11 and 12. If there is a fear that some engagement of the cone-type synchronizer clutches 11 may be caused, too, at a neutral condition of the change transmission 1 so that there is a fear that some forward directional torque may be transmitted to the change shaft at such condition due to the larger number of the forward directional gear trains, the change transmission 1 may satisfactorily be designed such that clearance between the frictional elements 17, 18 and thrust pin 23 or carrier 16 in the backward directional multidisc synchronizer clutch 12 at its disengaged condition is predetermined somewhat smaller than the corresponding clearance in the forward directional multidisc synchronizer clutch 12 at its disengaged condition.

FIG. 3 illustrates a lever guide for guiding a change lever 27 which is used for shifting or moving the shifter forks 24 and 26 shown in FIG. 1. As shown, the change lever 27 is operated to move along a H-shaped shift pattern. Because the vehicle speed is frequently changed between the forward directional second speed and backward directional speed, as set forth before, during a working operation using a front loader (not shown), the forward directional second-speed position ($F_2$) and backward directional speed position (R) of the change lever 27 are located at one and the other ends of one leg of H-letter. The forward directional first-speed position ($F_1$) and third-speed position ($F_3$) are located at one and the other ends of the other leg of H-letter. Each of the multidisc-type synchronizer clutches 12 has a capacity large enough to transmit power without being subjected to a seizing, when engaged, during the frequent displacements of change lever 27 between the position ($F_2$) and position (R).

Referring to the auxiliary change-speed transmission 36 shown in FIG. 2, the intermediate shaft 34 is drivenly connected to the change shaft 20 through a reduction gearing having meshing gears 48 and 49. Two change gears 51 and 52 are fixedly mounted on this intermediate shaft 34. Another change gear 50 which is driven to rotate by the smaller gear 51 of the two change gears on the intermediate shaft through a two-stage reduction gearing 53 is disposed at an outside of the intermediate shaft 34. On the propeller shaft 35, there are slidably but non-rotatably mounted a shift gear 54, which can be meshed selectively with gear 50 and with gear 51, and another shift gear 55 which can be meshed selectively with gear 52. The latter shift gear 54 carries a clutch half 55a which can be engaged with another clutch half 20a secured to a rear end of the change shaft 20. In operation, a first rotational speed (creep speed) is provided to propeller shaft 35 when the shift gear 54 is meshed with gear 50. Similarly, a second rotational speed is provided to shaft 35 when the shift gear 54 is meshed with gear 51, and a third speed is provided when the shift gear 55 is meshed with gear 52. Further, a fourth rotational speed is provided when the clutch halves 20a and 55a are engaged with each other so that the propeller shaft 35 is connected directly to the change shaft 20.

Figure 4:
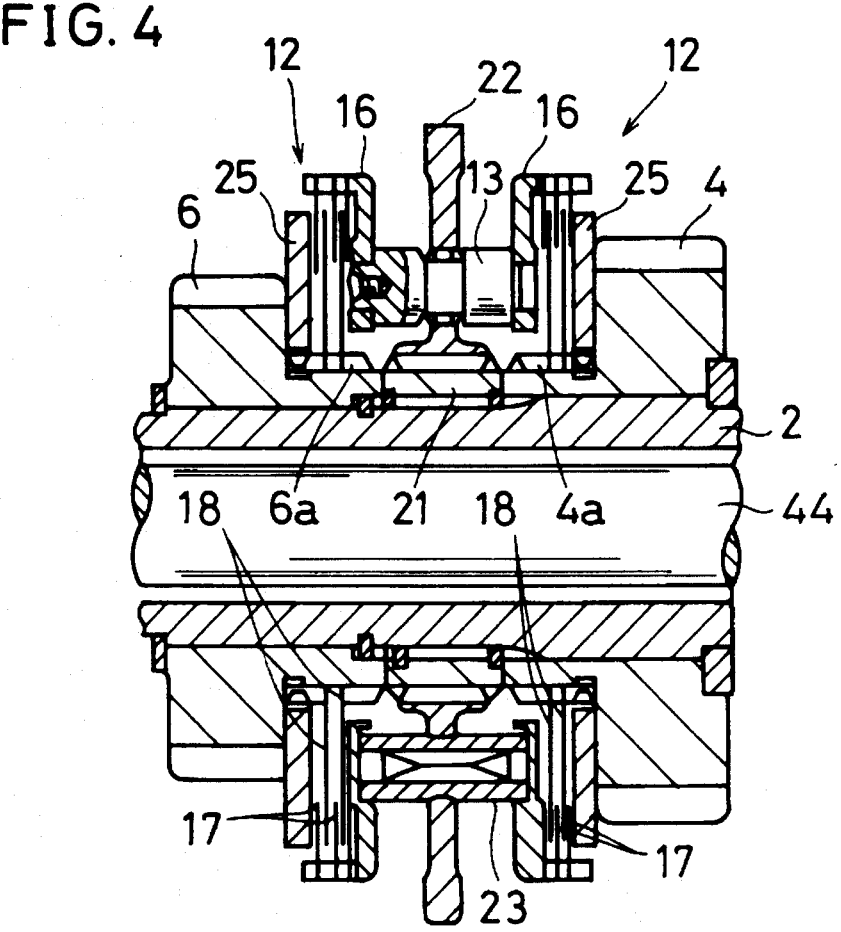
FIG. 4 is a sectional side view showing a variation of a part of the transmission shown in FIG. 1.

FIG. 4 illustrates a variation of the first embodiment. In this variation, a plurality of the second frictional elements 18 are supported by the boss portion of each gear 4, 6 using splines 4a, 6a. Accordingly, each reaction ring 25 does not include a portion corresponding to the hollow cylindrical portion 25a which is formed in the reaction ring 25 employed in the first embodiment. According to this variation, the outer diameter of multidisc-type synchronizer clutch 12 may be reduced.

Figure 5:
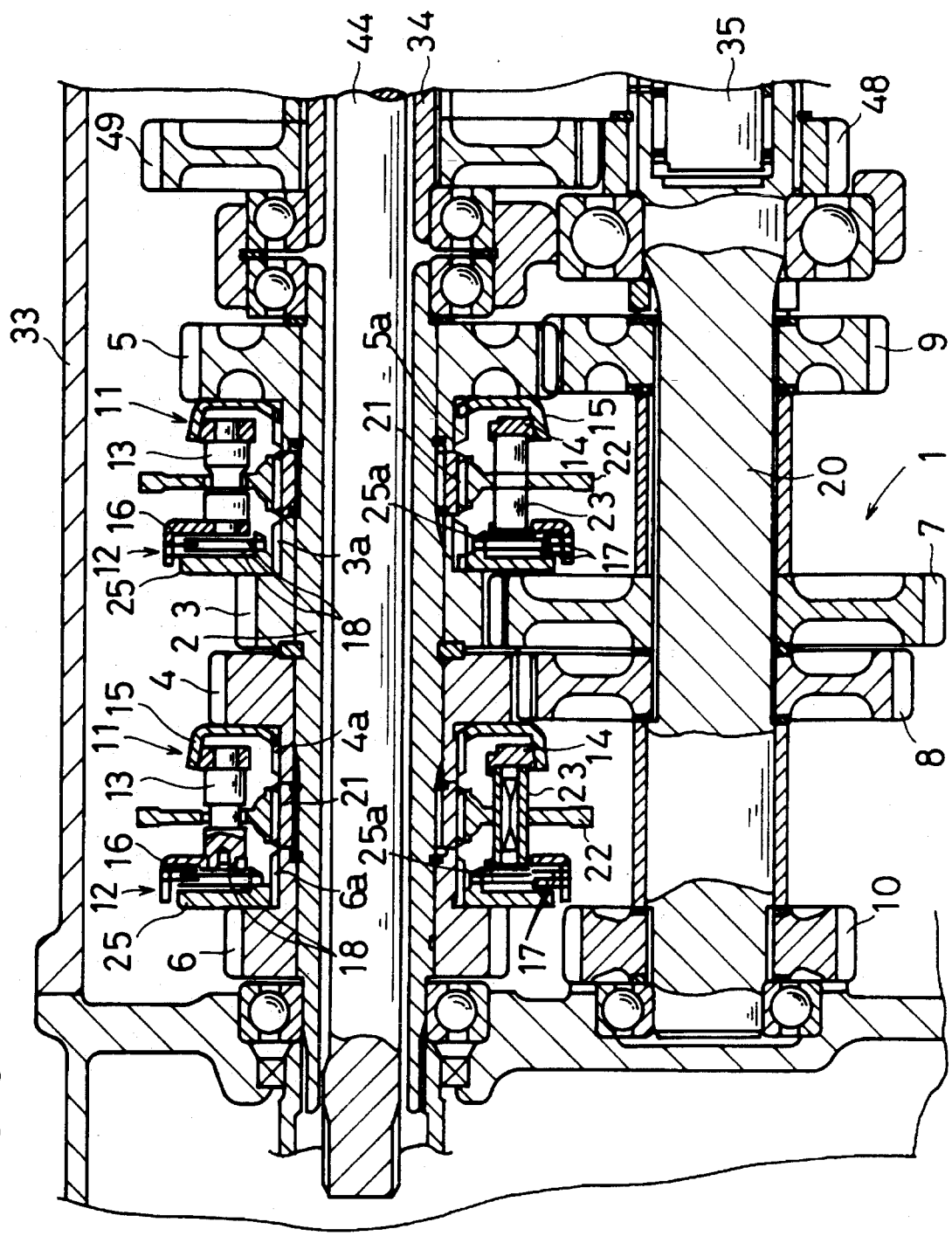
FIG. 5 is a sectional side view similar to FIG. 1 but showing a second preferred embodiment of the transmission according to the present invention.

In FIG. 5, there is shown a second embodiment in which gears of the change-speed transmission 1 are arranged and mounted similarly as in the first embodiment. In this embodiment, however, multidisc-type synchronizer clutches 12 are associated respectively with a gear 3 of the forward directional first-speed gear train, which transmits in operation a high torque at a low rotational speed, and with a gear 6 of the backward directional gear train. Cone-type synchronizer clutches 11 are associated with gears 4 and 5 of the forward directional second-speed and third-speed gear trains.

One cone-type clutch 11 and one multidisc-type clutch 12 are paired so as to provide a synchronizer double clutch assembly in which a splined hub 21, a shifter 22, one or more synchronizer pins 13, and one or more thrust pins 23 are made common to both types of the clutches 11 and 12. The other parts are substantially same as the corresponding parts of the first embodiment.

Figure 6:
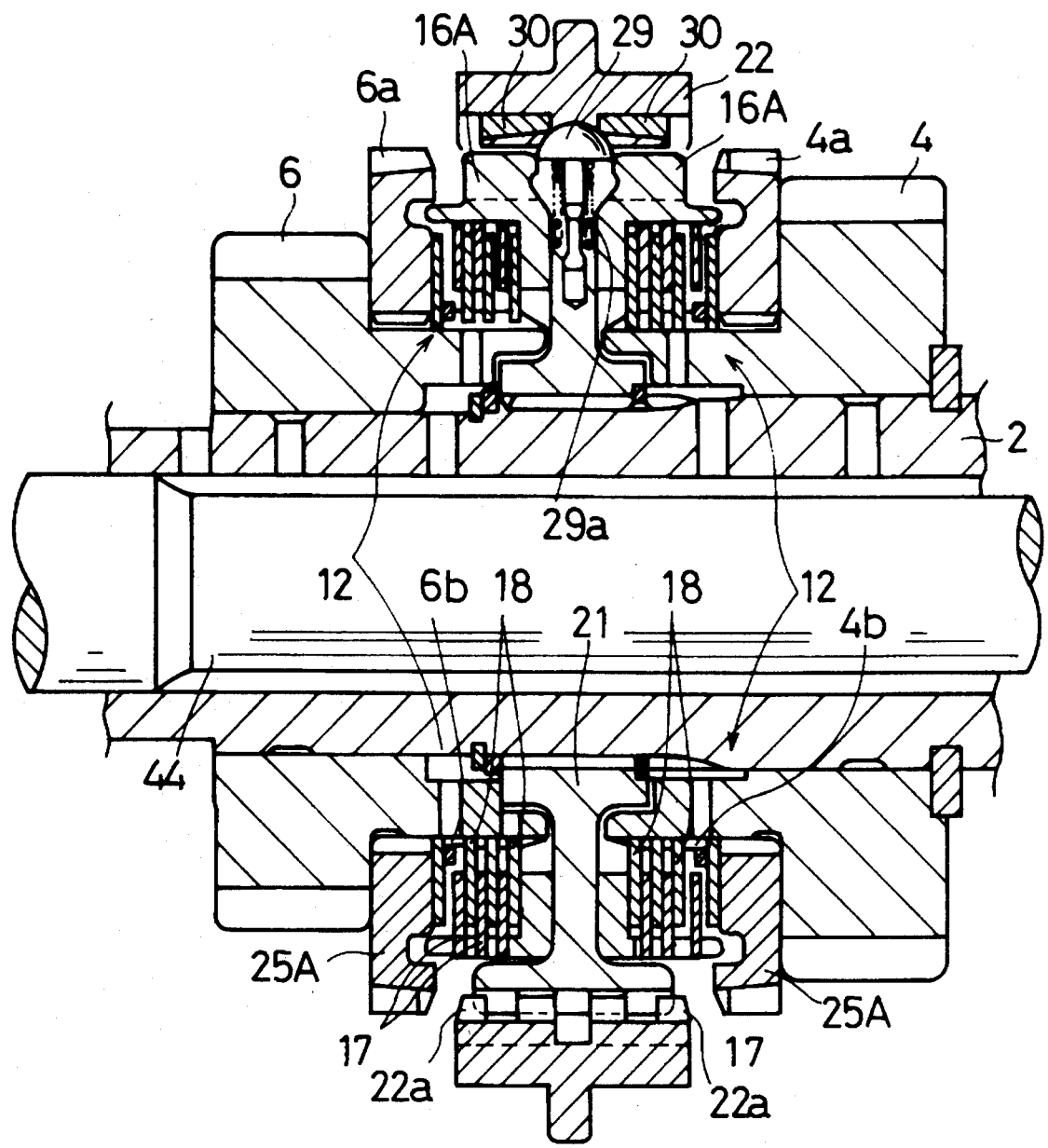
FIG. 6 is a sectional side view showing a part of a third preferred embodiment of the transmission according to the present invention.

FIG. 6 illustrates a part of a third preferred embodiment in which two multidisc synchronizer clutches 12 of the type disclosed in U.S. Pat. No. 4,830,159 referred to before are employed in place of the two multidisc synchronizer clutches 12 of pin type employed in the first embodiment.

These two clutches 12 which are associated with the forward directional second-speed gear 4 and with the backward directional gear 6 are composed to a synchronizer double clutch assembly in which a splined hub 21 fixedly mounted on the drive shaft 2, a shifter 22 spline-fitted on the hub 21, and latch pins 29 are made common to the two clutches 12. Each latch pin 29 is slidably received in a radial bore in the splined hub 21 and is biased by a spring 29a to move radially outwardly so as to engage shifter 22. Splines 4a and 6a with which splines 22a formed in the inner surface of the shifter 22 at both end portions thereof are to be meshed are formed in the outer surfaces of rings 25A which are fixedly mounted on the boss portions of gears 4 and 6 using splines 4b and 6b in these gear boss portions. A synchronizer ring 16A is disposed between the splined hub 21 and each ring 25A. A plurality of first and second frictional elements 17 and 18 are slidably but non-rotatably supported respectively by each synchronizer ring 16A and by the boss portion of each gear 4, 6. Further, inserts 30 with which latch pins 29 engage at their rounded heads are provided and are fitted in axial grooves formed in the inner surface of shifter 22. As detailed in U.S. Pat. No. 4,830,159, inserts 30 are adapted to control movements of the shifter 22 and synchronizer rings 16A.

The operation itself of the synchronizer clutch 12 shown in FIG. 6 is identical with the known clutch. When shifter 22 is operated to slide towards one direction or side from a neutral condition shown in FIG. 6, inserts 30 is displaced so as to cause an inclination of the latch pins 29 so that synchronizer ring 16A of that side is pushed by the heads of pins 29 so as to move towards gear 4 or 6 whereby engagement between the frictional elements 17 and 18 of that side is initiated. During a period when splines 22a and splines 4a or 6a are still in misalignment, stopper portions in the inserts 30 are in engagement with synchronizer ring 16A and this ring 16A is further pushed or forced under a condition where a sole displacement of the shifter 22 is restrained. When a synchronous rotation is attained by a full engagement between the frictional elements 17 and 18, shifter 22 is further displaced so as to achieve meshment of splines 22a with splines 4a or 6a. During such further displacement of shifter 22, synchronizer ring 16A is moved towards its original position under a control by the inserts 30.

While preferred embodiments of the invention have been described, it will be appreciated that various modifications and changes may be made without departing from the spirit and scope of the appended claims.

We claim:

1. In a vehicle multi-ratio transmission disposed between a drive shaft and a speed-change shaft and having a plurality of forward directional change-speed gear trains and a backward directional gear train, wherein each of the gear trains is actuated by a synchronizer clutch associated with said each gear train, said synchronizer clutch constituting a sole clutch means disposed between said drive shaft and said speed-change shaft for actuating said each gear train, the improvement characterized in:

that a multidisc-type synchronizer clutch (12) is associated with each of a heavily operated gear train of the forward directional change-speed gear trains and the backward directional gear train, whereas a cone-type synchronizer clutch (11) is associated with each of the other forward directional change-speed gear trains.

2. The vehicle multi-ratio transmission as set forth in claim 1, wherein said heavily operated gear train is a gear train (4, 8) which is actuated the most frequently of the forward directional change-speed gear trains.

3. The vehicle multi-ratio transmission as set forth in claim 1, wherein said heavily operated gear train is a gear train (3, 7) which provides the lowest forward directional speed of the vehicle.

* * * * *